United States Patent
Kim et al.

(10) Patent No.: US 12,421,373 B2
(45) Date of Patent: Sep. 23, 2025

(54) PLASTICIZER COMPOSITION AND RESIN COMPOSITION INCLUDING THE SAME

(71) Applicant: LG CHEM, LTD., Seoul (KR)

(72) Inventors: Hyun Kyu Kim, Daejeon (KR); Jeong Ju Moon, Daejeon (KR); Seok Ho Jeong, Daejeon (KR); Woo Hyuk Choi, Daejeon (KR)

(73) Assignee: LG CHEM, LTD., Seoul (KR)

( * ) Notice: Subject to any disclaimer, the term of this patent is extended or adjusted under 35 U.S.C. 154(b) by 617 days.

(21) Appl. No.: 17/628,606

(22) PCT Filed: Mar. 31, 2021

(86) PCT No.: PCT/KR2021/003956
§ 371 (c)(1),
(2) Date: Jan. 20, 2022

(87) PCT Pub. No.: WO2021/201578
PCT Pub. Date: Oct. 7, 2021

(65) Prior Publication Data
US 2022/0267567 A1 Aug. 25, 2022

(30) Foreign Application Priority Data

Apr. 2, 2020 (KR) .................. 10-2020-0040521

(51) Int. Cl.
*C08K 5/103* (2006.01)
*C08K 5/00* (2006.01)

(52) U.S. Cl.
CPC ............ *C08K 5/103* (2013.01); *C08K 5/0016* (2013.01)

(58) Field of Classification Search
CPC .................................................. C07C 69/33
See application file for complete search history.

(56) References Cited

U.S. PATENT DOCUMENTS

| | | |
|---|---|---|
| 2,760,632 A | 8/1956 | Hillyer |
| 2,958,706 A | 11/1960 | Hurwitz et al. |
| 2,975,152 A | 3/1961 | Hurwitz et al. |
| 5,430,108 A | 7/1995 | Schlosberg et al. |
| 5,658,863 A | 8/1997 | Duncan et al. |
| 5,681,800 A | 10/1997 | Duncan et al. |
| 5,767,047 A | 6/1998 | Duncan et al. |
| 5,817,607 A | 10/1998 | Duncan et al. |
| 2013/0131373 A1 | 5/2013 | Inayama et al. |
| 2015/0045466 A1 | 2/2015 | Sofuku et al. |
| 2015/0203657 A1 | 7/2015 | Gredegard et al. |
| 2017/0096543 A1 | 4/2017 | Magnusson et al. |
| 2018/0127390 A1 | 5/2018 | Inoue et al. |
| 2020/0002563 A1 | 1/2020 | Grimm et al. |
| 2020/0071574 A1 | 3/2020 | Sanz |

FOREIGN PATENT DOCUMENTS

| | | | | |
|---|---|---|---|---|
| CN | 102958902 A | 3/2013 | | |
| CN | 103732572 A | 4/2014 | | |
| CN | 109603912 A | 4/2019 | | |
| EP | 430657 A | * 6/1991 | ............. | C09K 5/045 |
| EP | 0802962 A | 6/1996 | | |
| EP | 0739377 B1 | 5/2020 | | |
| GB | 850395 A | 10/1960 | | |
| JP | H06-025474 A | 2/1994 | | |
| JP | 2016-027064 A | 2/2016 | | |
| KR | 10-2015-0003762 A | 1/2015 | | |
| KR | 10-2018-0012318 A | 2/2018 | | |
| RU | 2559449 C2 | 8/2015 | | |
| WO | 2018/158316 A1 | 9/2018 | | |
| WO | 2020/020485 A1 | 1/2020 | | |

OTHER PUBLICATIONS

Keshavaraj et al., "Neural-Network-Based Model Approach for Density of High-Molecular-Weight Esters Used as Plasticizers," Advances in Polymer Technology, 14 (3): 215-225 (1995).
Becker et al., "Safety Assessment of Pentaerythrityl Tetraesters as Used in Cosmetics," International Journal of Toxicology, 34, supplement 2: 99S-112S (2015).
International Search Report issued in corresponding International Patent Application No. PCT/KR2021/003956 dated Jul. 19, 2021.
Extended European Search Report issued in corresponding European Patent Application No. 21 781 659.4 dated Sep. 23, 2022.
Chemical Encyclopedia, ed. Knunyants I.L., publishing house "Soviet Encyclopedia", Moscow, 1990, vol. 2, p. 187, col. 365 106153732 A1.
Office Action issued on Mar. 19, 2024 for the corresponding Russian patent application 2022104053/04(008524).
Office Action and Search Report issued in corresponding CN Patent Application No. 202180004680.2, dated Feb. 18, 2023. (U.S. Pat. No. 2975152 A and CN 109603912 A cited therein have been cited in earlier-filed SB08.).

* cited by examiner

*Primary Examiner* — Brieann R Johnston
(74) *Attorney, Agent, or Firm* — Morgan, Lewis & Bockius LLP

(57) ABSTRACT

The present invention relates to a tetraester-based plasticizer composition characterized in including a product derived from esterification reaction of an isomer mixture of hexanoic acid and a tetraol, wherein the degree of branching of the isomer mixture of hexanoic acid is 2.0 or less. If the plasticizer composition is applied to a resin, plasticization efficiency and absorption rate may be maintained to equal or better levels when compared to a case applying the conventional plasticizer, and mechanical properties, migration resistance, stress migration and loss properties may be markedly improved.

8 Claims, No Drawings

PLASTICIZER COMPOSITION AND RESIN COMPOSITION INCLUDING THE SAME

CROSS-REFERENCE TO RELATED APPLICATION

The present application claims the benefit of priority based on Korean Patent Application No. 10-2020-0040521, filed on Apr. 2, 2020, the entire contents of which are incorporated herein by reference.

TECHNICAL FIELD

The present invention relates to a plasticizer composition including a tetraester-based composition, and a resin composition including the same.

BACKGROUND ART

Generally, plasticizers are obtained through the reaction of alcohols with polycarboxylic acids such as phthalic acid and adipic acid to form corresponding esters. In addition, considering the internal and external regulations on harmful phthalate-based plasticizers to the human body, studies are being continued on plasticizer compositions which may replace phthalate-based plasticizers such as terephthalate-based, adipate-based and other polymer-based plasticizers.

Meanwhile, regardless of the type of industry including plastisol type of industry of flooring materials, wallpaper, soft and hard sheets, etc., calendaring type of industry, or extrusion/injection compound type of industry, the demand for eco-friendly products is increasing. In order to reinforce the quality properties, processability and productivity by the finished products, an appropriate plasticizer is required considering discoloration, migration, mechanical properties, etc.

According to the properties required by the types of industry in various areas of usage, such as tensile strength, elongation rate, light resistance, migration, gelling properties and absorption rate, supplementary materials such as a plasticizer, a filler, a stabilizer, a viscosity decreasing agent, a dispersant, a defoaming agent and a foaming agent are mixed with a PVC resin.

For example, in case of applying di(2-ethylhexyl) terephthalate (DEHTP) which is relatively cheap and widely used among plasticizer compositions which may be applied to PVC, hardness or sol viscosity is high, absorption rate of a plasticizer is relatively slow, and migration and stress migration are not good.

As improvements on the above limitations, the application of a transesterification product with butanol as a plasticizer, as a composition including DEHTP may be considered. In this case, plasticization efficiency is improved but volatile loss or thermal stability is inferior and mechanical properties are somewhat degraded, and the improvement of physical properties is required. Accordingly, there is no solution but employing a method compensating the defects through mixing with a second plasticizer at the present time.

However, in case of applying the second plasticizer, there are drawbacks of generating unexpected defects as follows: the change of the physical properties is hard to predict, the application may become a factor of increasing the unit cost of the product, the improvement of the physical properties is not clearly shown except for specific cases, and problems relating to compatibility with a resin may arise.

In addition, if a material like tri(2-ethylhexyl) trimellitate or triisononyl trimellitate is applied as a trimellitate-based product in order to improve the inferior migration and loss properties of the DEHTP products, migration or loss properties may be improved, but plasticization efficiency may be degraded, and a great deal of the material is required to be injected to provide a resin with suitable plasticization effect, and considering relatively the high unit price of the products, commercialization thereof is impossible.

Accordingly, the development of products for solving the environmental issues of the conventional phthalate-based products or products for improving inferior physical properties of the eco-friendly products for improving the environmental issues of the phthalate-based products is required.

DISCLOSURE OF THE INVENTION

Technical Problem

The present invention is to provide a plasticizer composition which may maintain equal or better plasticization efficiency and absorption rate when compared to a case applying the conventional plasticizer, and may markedly improve mechanical properties, migration resistance, stress resistance and loss properties, by including a tetraester-based composition which is a product derived from the esterification of an isomer mixture of hexanoic acid and a tetraol in a plasticizer composition.

Technical Solution

To solve the tasks, there is provided according to an embodiment of the present invention, a plasticizer composition including a tetraester-based composition including one or more tetraesters represented by Formula 1 below, wherein alkyl groups of the tetraester are derived from an isomer mixture of hexanoic acid having a degree of branching of 2.0 or less.

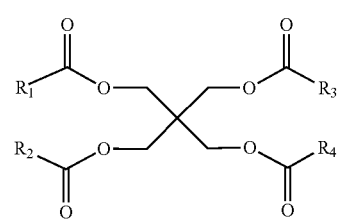

[Formula 1]

In Formula 1, $R_1$ to $R_4$ are each independently an n-pentyl group, a branched pentyl group, or a cyclopentyl group.

In order to solve the tasks, there is provided in another embodiment of the present invention, a resin composition including: 100 parts by weight of a resin; and 5 to 150 parts by weight of the plasticizer composition.

The resin may be one or more selected from the group consisting of a straight vinyl chloride polymer, a paste vinyl chloride polymer, an ethylene vinyl acetate copolymer, an ethylene polymer, a propylene polymer, polyketone, polystyrene, polyurethane, natural rubber and synthetic rubber.

Advantageous Effects

The plasticizer composition according to an embodiment of the present invention, if used in a resin composition, may have equal or better plasticization efficiency and absorption rate when compared to the conventional plasticizer, and may markedly improve mechanical properties, migration resistance, stress migration and loss properties.

MODE FOR CARRYING OUT THE INVENTION

It will be understood that terms or words used in the present disclosure and claims should not be interpreted as having a meaning that is defined in common or in dictionaries, however should be interpreted in consistent with the technical scope of the present invention based on the principle that inventors may appropriately define the concept of the terms to explain the invention at his best method.

Definition of Terms

The term "composition" as used in the present disclosure includes a mixture of materials including the corresponding composition as well as a reaction product and a decomposition product formed from the materials of the corresponding composition.

The prefix "iso-" as used in the present disclosure means an alkyl group in which a methyl group having one carbon atom is combined as a branched chain with the main chain of the alkyl group, and may generally mean an alkyl group in which a methyl branch is combined at the terminal of the alkyl group, but in the present disclosure, unless otherwise no separate alkyl group is present, may be used as a generic term of an alkyl group in which a methyl group or an ethyl group is combined as a branched chain including its terminal with the main chain.

The term "isomer" as used in the present disclosure is not intended to distinguish isomers of all meanings but a structural isomer, that is, means a relation between isomers having the same carbon number but different bonding structures, and intends to differentiate therebetween, whereas does not mean a material which is a stereoisomer such as an enantiomer and a diastereomer.

The term "straight vinyl chloride polymer" as used in the present disclosure may be one type of vinyl chloride polymers and polymerized by suspension polymerization, bulk polymerization, etc., and may refer to a polymer having a porous particle shape in which a large number of pores having a size of tens to hundreds of micrometers, no cohesiveness, and excellent flowability are dispersed.

The term "paste vinyl chloride polymer" as used in the present disclosure may be one type of vinyl chloride polymers and polymerized by microsuspension polymerization, microseed polymerization, emulsion polymerization, etc., and may refer to a polymer having minute particles without pores and a size of tens to thousands of nanometers, cohesiveness, and inferior flowability.

The terms "comprising", and "having" and the derivatives thereof in the present invention, whether these terms are particularly disclosed or not, do not exclude the presence of optional additional components, steps, or processes. In order to avoid any uncertainty, all compositions claimed by using the term "comprising" may include optional additional additives, auxiliaries, or compounds, including a polymer or any other materials, unless otherwise described to the contrary. In contrast, the term "consisting essentially of" excludes unnecessary ones for operation and precludes optional other components, steps or processes from the scope of optional continuous description.

The term "consisting of" excludes optional components, steps or processes, which are not particularly described or illustrated.

Measurement Methods

In the present disclosure, the content analysis of the components in a composition is conducted by gas chromatography measurement using a gas chromatography equipment of Agilent Co. (product name: Agilent 7890 GC, column: HP-5, carrier gas: helium (flow rate of 2.4 ml/min), detector: F.I.D., injection volume: 1 µl, initial value: 70° C./4.2 min, end value: 280° C./7.8 min, program rate: 15° C./min).

In the present disclosure, "hardness" means Shore hardness (Shore "A" and/or Shore "D") at 25° C. and is measured in conditions of 3T 10 s using ASTM D2240. The hardness may be an index for evaluating plasticization efficiency, and the lower the value is, the better the plasticization efficiency is.

In the present disclosure, "tensile strength" is obtained according to an ASTM D638 method by drawing a specimen in a cross head speed of 200 mm/min (1T) using a test apparatus of U.T.M (manufacturer: Instron, model name: 4466), measuring a point where the specimen is cut, and calculating as follows.

Tensile strength ($kgf/cm^2$)=load value (kgf)/thickness (cm)×width (cm)

In the present disclosure, "elongation rate" is obtained according to an ASTM D638 method by drawing a specimen in a cross head speed of 200 mm/min (1T) using the U.T.M, measuring a point where the specimen is cut, and calculating as follows.

Elongation rate (%)=length after elongation/initial length×100

In the present disclosure, "migration loss" is obtained according to KSM-3156, by which a specimen with a thickness of 2 mm or more is obtained, glass plates are attached onto both sides of the specimen and a load of 1 $kgf/cm^2$ is applied. The specimen is stood in a hot air circulation type oven (80° C.) for 72 hours, then taken out therefrom and cooled at room temperature for 4 hours. Then, the glass plates attached onto both sides of the specimen are removed, the weights before and after standing the glass plates and the specimen plate in the oven are measured, and the migration loss is calculated as follows.

Migration loss (%)={[(weight of initial specimen)−(weight of specimen after standing in oven)]/(weight of initial specimen)}×100

In the present disclosure, "volatile loss" is obtained by processing a specimen at 80° C. for 72 hours and then, measuring the weight of the specimen.

Volatile loss (wt %)={[(weight of initial specimen)−(weight of specimen after processing)]/(weight of initial specimen)}×100

In case of the various measurement conditions, the details of the conditions of the temperature, the speed of revolution, the time, etc., may be somewhat changed according to situations, and if the conditions are different, a measurement method and its conditions are required to be separately indicated.

Hereinafter, the present invention will be explained in more detail to assist the understanding of the present invention.

According to an embodiment of the present invention, a plasticizer composition includes a tetraester-based composition containing one or more tetraesters of Formula 1 below, and the alkyl groups of the tetraester are derived from an isomer mixture of hexanoic acid having the degree of branching of 2.0 or less.

[Formula 1]

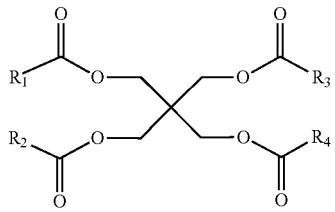

In Formula 1, $R_1$ to $R_4$ are each independently an n-pentyl group, a branched pentyl group, or a cyclopentyl group.

The tetraester-based composition may be a product produced by esterification reaction between an isomer mixture of hexanoic acid and pentaerythritol which is a tetraol, and accordingly, is derived from a carboxylic acid having a carbon chain with 6 carbon atoms including the central carbon of a carbonyl group. Accordingly, a linear, branched or alicyclic alkyl group having 5 carbon atoms may be applied as R1 to R4 of Formula 1.

The plasticizer composition according to an embodiment of the present invention includes a tetraester-based composition containing one or more tetraesters represented by Formula 1, but the number of the tetraesters in the tetraester-based composition finally produced may be determined according to the number of the hexanoic acids included in the isomer mixture of hexanoic acid which is applied to the esterification reaction. For example, if 2 isomer types are included in the isomer mixture of hexanoic acid, at least 5 types of tetraesters may be included in the plasticizer composition, and if 3 isomer types are included, at least 15 types of tetraesters may be included in the plasticizer composition.

In the tetraester-based composition according to an embodiment of the present invention, particularly, an alkyl carboxylic acid having 6 carbon atoms, i.e., hexanoic acid is applied, and if used as a plasticizer, balance between plasticization efficiency and mechanical properties may be excellent when compared to a case of applying one having a different carbon number. If an alkyl carboxylic acid having 5 or less carbon atoms is applied, mechanical properties and stress migration may be inferior, and if an alkyl carboxylic acid having 7 or more carbon atoms is applied, plasticization efficiency may be inferior, absorption rate may be very slow, and processability may be significantly degraded.

In addition, considering that the tetraester included in the tetraester-based composition is a compound in which 4 ester groups are present, if used as a plasticizer, compatibility with a resin may be excellent, miscibility with other additives may be excellent, and since a molecule may be fixed in a polymer chain due to lots of ester groups, migration resistance and stress resistance may be excellent, and plasticization efficiency may be excellent.

Further, different from a case where a benzene ring is present in a molecule like a petroleum-based plasticizer, a benzene ring is not present in a molecule, and the tetraester is classified into an eco-friendly plasticizer but is assessed for having excellent performance even though compared to the petroleum-based plasticizer. This is apprehended that the plasticizer is prepared from the reaction between a polyalcohol and a monocarboxylic acid, different from the conventional plasticizer prepared from the reaction between a poly acid and a monoalcohol.

The tetraester-based composition according to an embodiment of the present invention may include a triester and a diester besides the tetraester in the composition, and the mixture weight of the triester and the diester may be 20.0 wt % or less with respect to the total weight of the tetraester-based composition. The mixture weight of the triester and the diester may preferably be 10.0 wt % or less, more preferably, 5.0 wt % or less, even more preferably, 1.0 wt % or less. However, the triester and the diester included in the tetraester-based composition herein mean by-products derived from the reaction between hexanoic acid and pentaerythritol, but not mean other types of ester compounds including trimellitate, terephthalate, isophthalate, citrate, or the like.

The alkyl group of the tetraester included in the tetraester-based composition according to an embodiment of the present invention is derived from the isomer mixture of hexanoic acid having the degree of branching of 2.0 or less, preferably, the degree of branching of 1.5 or less, 1.3 or less, 1.2 or less, or 1.0 or less. In addition, the degree of branching may be 0.1 or more, 0.2 or more, 0.3 or more. The alkyl group may be derived from the isomer mixture of hexanoic acid by the esterification reaction, and the degree of branching may be maintained even after being transformed into a tetraester-based composition.

Here, the degree of branching may mean that how many branched carbon atoms do the alkyl groups bonded to a material included in the composition have, and may be determined according to the weight ratio of the corresponding material. For example, if 60 wt % of 1-hexanoic acid, 30 wt % of 2-methylpentanoic acid and 10 wt % of 2-ethylbutanoic acid are included in the mixture of hexanoic acid, the numbers of the branched carbon atoms of the carboxylic acids are 0, 1 and 2, respectively, and the degree of branching may be calculated by [(60×0)+(30×1)+(10×2)]/100, and may be 0.5.

Particularly, according to the features on the ratio degree of the presence of branched alkyl groups among total alkyl radicals, further, on the ratio degree of the presence of a specific branched alkyl radical among the branched alkyl groups, the balance of plasticization efficiency and physical properties of migration resistance/loss properties may be controlled even better, processability may be optimized, mechanical properties such as tensile strength and elongation rate and stress resistance may be markedly improved due to the interaction of a plurality of tetraesters included in the composition.

Through this, products completely free from environmental issues and at the same time having markedly improved tensile strength from the conventional phthalate-based products may be accomplished, and products having markedly improved migration resistance and stress resistance from the conventional terephthalate-based products, greatly improved balance between physical properties from the conventional commercial products and greatly increased degrees thereof may be accomplished.

According to an embodiment of the present invention, in order to accomplish the above-described effects optimally and preferably, the isomer mixture of hexanoic acid may essentially include 2-methylpentanoic acid and 3-methylpentanoic acid. By essentially including the two isomers in the isomer mixture, the above-described effects may be achieved with even higher reproducibility.

In addition, the isomer mixture of hexanoic acid may further include 1-hexanoic acid and cyclopentyl methanoic acid in addition to 2-methylpentanoic acid and 3-methylpentanoic acid. For the 1-hexanoic acid, if the amount added increases, specific properties may tend to improve, but the amount is required to be controlled considering processability of absorption rate or plasticization efficiency, and this applies the same way for the cyclopentyl methanoic acid.

According to an embodiment of the present invention, with respect to total 100 parts by weight of the mixture, a branched hexanoic acid may be included in 20 parts by weight or more, 30 parts by weight or more, 40 parts by weight or more, 50 parts by weight or more, and 95 parts by weight or less, 90 parts by weight or less, 85 parts by weight or less, 80 parts by weight or less, or 70 parts by weight or less in the isomer mixture of hexanoic acid.

In addition, with respect to total 100 parts by weight of the isomer mixture of hexanoic acid, 1-hexanoic acid may be included in 80 parts by weight or less, 70 parts by weight or less, 60 parts by weight or less, 50 parts by weight or less, and 5 parts by weight or more, 10 parts by weight or more, 15 parts by weight or more, 20 parts by weight or more or 25 parts by weight or more.

The amounts included of the branch type and linear type may be suitably controlled according to the use of the tetraester-based composition applied as a plasticizer, and through the control of the ratio, physical properties to accomplish may be achieved.

Further, the isomer mixture may further include cyclopentyl methanoic acid, and in this case, may include 30 parts by weight or less with respect to total 100 parts by weight of the isomer mixture. Preferably, the cyclopentyl methanoic acid may be included in 20 parts by weight or less, parts by weight or less. In case of the cyclopentyl methanoic acid, only if included in practice, the improvement of processability and the improvement of physical properties may be achieved, and the amount thereof may be controlled considering the degradation of physical properties according to the decrease of the relative amounts of other isomers.

In the isomer mixture of hexanoic acid which determines the degree of branching of the tetraester-based composition according to an embodiment of the present invention, various isomers may be included, typically, four types of isomers have been referred to, but the presence of other isomers is not ruled out.

A method of preparing the plasticizer composition according to an embodiment of the present invention is a method well-known in the art, and any methods that may prepare the aforementioned plasticizer composition may be applied without specific limitation.

That is, by suitably controlling the esterification reaction, the plasticizer composition according to the present invention may be prepared, and for example, the plasticizer composition including the tetraester-based composition may be prepared by direct esterification reaction of the isomer mixture of hexanoic acid and a tetraol, i.e., pentaerythritol.

The plasticizer composition according to an embodiment of the present invention is a material prepared by suitably performing the esterification reaction, and the preparation method is not specifically limited only if the above-described conditions are satisfied, particularly, if the ratio of the branched hexanoic acid in the isomer mixture is controlled.

For example, the direct esterification reaction may be performed by a step of injecting an isomer mixture of hexanoic acid and pentaerythritol, adding a catalyst and reacting under a nitrogen atmosphere; a step of removing unreacted alcohol and neutralizing unreacted acid; and a step of dehydrating by distillation under a reduced pressure and filtering.

The isomer mixture of hexanoic acid, i.e., monocarboxylic acid may play the main function of determining a component ratio in the composition prepared, and a theoretical molar ratio with the tetraol, for example, pentaerythritol of 4:1 may be applied. If the isomer mixture of hexanoic acid is additionally injected in a greater ratio than the molar ratio, it may contribute to the increase of the reaction rate. In this case, the additional injection amount of the isomer mixture of hexanoic acid may be 500 mol % or less, 400 mol % or less, or 300 mol % or less, preferably, 200 mol % or less or 100 mol % or less with respect to the equivalent of the isomer mixture of hexanoic acid.

The catalyst may be, for example, at least one or more selected from an acid catalyst such as sulfuric acid, hydrochloric acid, phosphoric acid, nitric acid, paratoluenesulfonic acid, methanesulfonic acid, ethanesulfonic acid, propanesulfonic acid, butanesulfonic acid, and alkyl sulfate, a metal salt such as aluminum lactate, lithium fluoride, potassium chloride, cesium chloride, calcium chloride, iron chloride, and aluminum phosphate, a metal oxide such as a heteropoly acid, natural/synthetic zeolites, cation and anion exchange resins, and an organometal such as tetraalkyl titanate and polymers thereof. In a particular embodiment, the catalyst may use tetraalkyl titanate. Preferably, as an acid catalyst having a low activation temperature, paratoluenesulfonic acid and methanesulfonic acid may be suitable.

The amount used of the catalyst may be different according to the types thereof, and for example, a homogeneous catalyst may be used in an amount of 0.01 to 5.00 wt %, 0.01 to 3.00 wt %, 0.1 to 3.0 wt % or 0.1 to 2.0 wt % based on total 100 wt % of reactants, and a heterogeneous catalyst may be used in an amount of 5 to 200 wt %, 5 to 100 wt %, 20 to 200 wt %, or 20 to 150 wt % based on the total amount of the reactants.

In this case, the reaction temperature may be within a range of 100 to 280° C., 100 to 250° C., or 100 to 230° C.

According to another embodiment of the present invention, a resin composition including the aforementioned plasticizer composition and a resin is provided.

The resin may use resins well-known in the art. For example, a mixture of one or more selected from the group consisting of a straight vinyl chloride polymer, a paste vinyl chloride polymer, an ethylene vinyl acetate copolymer, an ethylene polymer, a propylene polymer, polyketone, polystyrene, polyurethane, natural rubber, synthetic rubber and thermoplastic elastomer may be used, without limitation.

The plasticizer composition may be included in 5 to 150 parts by weight, preferably, 5 to 130 parts by weight, or 10 to 120 parts by weight based on 100 parts by weight of the resin.

Generally, the resin using the plasticizer composition may be prepared into a resin product through a melt processing or a plastisol processing, and a resin by the melt processing and a resin from the plastisol processing may be produced differently according to each polymerization method.

For example, in case of using a vinyl chloride polymer in a melt processing, solid phase resin particles having a large average particle diameter are prepared by suspension polymerization, or the like and used, and the vinyl chloride polymer is referred to as a straight vinyl chloride polymer. In case of using a vinyl chloride polymer in a plastisol processing, a sol state resin as minute resin particles is prepared by emulsion polymerization, or the like and used, and this vinyl chloride polymer is referred to as a paste vinyl chloride resin.

In case of the straight vinyl chloride polymer, a plasticizer may preferably be included in a range of 5 to 80 parts by weight with respect to 100 parts by weight of the polymer, and in case of the paste vinyl chloride polymer, the plasticizer may preferably be included in a range of 40 to 120 parts by weight with respect to 100 parts by weight of the polymer.

The resin composition may further include a filler. The filler may be 0 to 300 parts by weight, preferably, 50 to 200 parts by weight, more preferably, 100 to 200 parts by weight based on 100 parts by weight of the resin.

The filler may use fillers well-known in the art and is not specifically limited. For example, the filler may be a mixture of one or more kinds selected from silica, magnesium carbonate, calcium carbonate, hard coal, talc, magnesium hydroxide, titanium dioxide, magnesium oxide, calcium hydroxide, aluminum hydroxide, aluminum silicate, magnesium silicate and barium sulfate.

In addition, the resin composition may further include other additives such as a stabilizer as necessary. Each of the other additives such as the stabilizer may be, for example, 0 to 20 parts by weight, preferably, 1 to 15 parts by weight based on 100 parts by weight of the resin.

The stabilizer may use, for example, a calcium-zinc-based (Ca—Zn-based) stabilizer such as a composite stearate of calcium-zinc or a barium-zinc-based (Ba—Zn-based) stabilizer, but is not specifically limited.

The resin composition may be applied to both a melt processing and a plastisol processing as described above, and a calendaring processing, an extrusion processing, or an injection processing may be applied to the melt processing, and a coating processing, or the like may be applied to the plastisol processing.

EXAMPLE

Hereinafter, embodiments will be explained in detail to particularly explain the present invention. The present invention may, however, be embodied in different forms and should not be construed as limited to the embodiments set forth herein. Rather, these embodiments are provided so that this disclosure will be thorough and complete, and will fully convey the scope of the inventive concept to those skilled in the art.

Example 1

To a reactor equipped with a stirrer, a condenser and a decanter, 1160 g of 1-hexanoic acid, 272 g of pentaerythritol, and 5 g of methanesulfonic acid were injected, and esterification reaction was performed and finished under a nitrogen atmosphere, while controlling the reaction temperature in a range of 100° C. to 140° C. according to the boiling points of raw materials and the conversion ratio of the reaction. After removing unreacted acid, a catalyst and a product were neutralized and washed with an alkaline aqueous solution, and unreacted raw materials and moisture were purified to finally obtain a tetraester-based plasticizer composition.

Examples 2 to 12

Tetraester-based plasticizer compositions of Examples 2 to 11 were obtained by preparing ester compositions by the same method as in Example 1 except for injecting carboxylic acids having 6 alkyl carbon atoms or isomer mixtures thereof described in Table 1 below instead of 1-hexanoic acid.

TABLE 1

| No | Material | Weight ratio |
|---|---|---|
| Example 2 | 2-MPA/3-MPA/1-HA/CPMA | 15/50/30/5 |
| Example 3 | 2-MPA/3-MPA/1-HA/CPMA | 30/30/30/10 |
| Example 4 | 2-MPA/3-MPA/1-HA/CPMA | 40/40/10/10 |
| Example 5 | 2-MPA/3-MPA/1-HA/CPMA | 30/40/20/10 |
| Example 6 | 2-MPA/3-MPA/1-HA/CPMA | 30/50/5/15 |
| Example 7 | 2-MPA/3-MPA/1-HA/CPMA | 50/40/2/8 |
| Example 8 | 2-MPA/3-MPA/1-HA/CPMA | 60/30/8/2 |
| Example 9 | 2-MPA/3-MPA/1-HA/CPMA | 40/50/10 |
| Example 10 | 2-MPA/3-MPA/1-HA/CPMA | 30/40/30 |
| Example 11 | 2-MPA/3-MPA/1-HA | 40/50/10 |

* 2-MPA: 2-methylpentanoic acid
* 3-MPA: 3-methylpentanoic acid
* 1-HA: 1-hexanoic acid
* CPMA: cyclopentyl methanoic acid Comparative Example 1

Dioctyl phthalate (DOP, LG Chem,) was applied as a plasticizer.

Comparative Example 2

Diisononyl phthalate (DINP, LG Chem,) was applied as a plasticizer.

Comparative Example 3

GL300 which is a product of LG Chem, and dioctyl terephthalate was used as a plasticizer.

Comparative Example 4

GL520 which is a product of LG Chem, and a mixture of dibutyl terephthalate, butyloctyl terephthalate and dioctyl terephthalate was applied as a plasticizer.

Comparative Example 5

GL330T which is a product of LG Chem, and a mixture of dioctyl terephthalate and tributyl citrate was applied as a plasticizer.

Comparative Example 6

BET which is a product of LG Chem, and a product derived from esterification of trimethylol propane, 2-ethylhexanoic acid and benzoic acid was applied as a plasticizer.

Comparative Example 7

Pevalen which is a product of Perstorp Co. and a product derived from esterification of valeric acid and pentaerythritol was applied as a plasticizer.

Comparative Example 8

To a reactor equipped with a stirrer, a condenser and a decanter, 1350 g of n-heptanoic acid, 272 g of pentaerythritol, and 5 g of methanesulfonic acid were injected, and esterification reaction was performed and finished under a nitrogen atmosphere, while controlling the reaction temperature in a range of 100° C. to 140° C. according to the boiling points of raw materials and the conversion ratio of the reaction. After removing unreacted acid, a catalyst and a product were neutralized and washed with an alkaline aqueous solution, and unreacted raw materials and moisture were purified to finally obtain a tetraester-based plasticizer composition.

Experimental Example 1: Evaluation of Sheet Performance

By using the plasticizers of the Examples and Comparative Examples, specimens were manufactured according to ASTM D638 and the prescription and manufacturing conditions below.

(1) Prescription: 100 parts by weight of a straight vinyl chloride polymer (LS100S), 50 parts by weight of a plasticizer and 3 parts by weight of a stabilizer (BZ-153T)

(2) Mixing: mixing at 98° C. in 700 rpm (3) Manufacture of specimen: 1T, 2T and 3T sheets were manufactured by processing at 165° C. for 4 minutes by a roll mill, and at 180° C. for 2.5 minutes (low pressure) and 2 minutes (high pressure) by a press (4) Test Items 1) Hardness: Shore hardness (Shore "A" and "D") at 25° C. was measured using a 3T specimen for 10 seconds using ASTM D2240. The plasticization efficiency was assessed excellent if the value was small.

2) Tensile strength: By an ASTM D638 method, a specimen was drawn in a cross head speed of 200 mm/min using a test apparatus of U.T.M (manufacturer: Instron, model name: 4466), and a point where the 1T specimen was cut was measured. The tensile strength was calculated as follows.

Tensile strength (kgf/cm$^2$)=load value (kgf)/thickness (cm)×width (cm)

3) Elongation rate measurement: By an ASTM D638 method, a specimen was drawn in a cross head speed of 200 mm/min using a test apparatus of U.T.M, and a point where the 1T specimen was cut was measured. The elongation rate was calculated as follows.

Elongation rate (%)=length after elongation/initial length×100

4) Migration loss measurement: According to KSM-3156, a specimen with a thickness of 2 mm or more was obtained, glass plates were attached onto both sides of 1T specimen, and a load of 1 kgf/cm$^2$ was applied. The specimen was stood in a hot air circulation type oven (80° C.) for 72 hours and then taken out and cooled at room temperature for 4 hours. Then, the weights of the specimen from which glass plates attached onto both sides thereof were removed, were measured before and after standing the glass plates and the specimen plate in the oven, and the migration loss was calculated as follows.

Migration loss (%)={[(weight of initial specimen)−(weight of specimen after standing in oven)]/(weight of initial specimen)}×100

5) Volatile loss measurement: The specimen manufactured was processed at 80° C. for 72 hours, and the weight of the specimen was measured.

Volatile loss (wt %)={[(weight of initial specimen)−(weight of specimen after processing)]/(weight of initial specimen)}×100

6) Stress test (stress resistance): A specimen with a thickness of 2 mm in a bent state was stood at 23° C. for 168 hours, and the degree of migration (degree of oozing) was observed. The results were recorded as numerical values, and excellent properties were shown if the value was closer to 0.

7) Absorption rate measurement: Absorption rate was evaluated by measuring the time consumed for mixing a resin and a plasticizer, and stabilizing the torque of a mixer by using a planatary mixer (Brabender, P600) in conditions of 73° C. and 60 rpm to evaluate processability. According to the degree of excellence, evaluation was assessed by the measure of 1 to 5, and excellent one was designated by 5, and inferior one was designated by 1.

(5) Evaluation Results

The evaluation results on the test items are listed in Table 2 below.

TABLE 2

| | Hardness | | Tensile strength | Elongation | Migration | Volatile | Stress | Absorption |
|---|---|---|---|---|---|---|---|---|
| | (Shore A) | (Shore D) | (kgf/cm$^2$) | rate (%) | loss (%) | loss (%) | resistance | rate |
| Example 1 | 84.0 | 37.8 | 214.7 | 320.7 | 1.40 | 0.39 | 0 | 5 |
| Example 2 | 84.1 | 37.9 | 215.4 | 321.2 | 1.41 | 0.46 | 0 | 5 |
| Example 3 | 84.2 | 37.8 | 216.8 | 320.9 | 1.45 | 0.40 | 0 | 5 |
| Example 4 | 84.5 | 38.1 | 214.6 | 317.4 | 1.40 | 0.47 | 0.5 | 5 |
| Example 5 | 84.3 | 37.9 | 208.6 | 304.6 | 1.38 | 0.38 | 0.5 | 5 |
| Example 6 | 84.2 | 38.0 | 215.6 | 321.1 | 1.32 | 0.41 | 0 | 5 |
| Example 7 | 84.5 | 38.1 | 220.2 | 321.5 | 1.40 | 0.45 | 0.5 | 5 |
| Example 8 | 84.5 | 38.0 | 217.8 | 320.0 | 1.41 | 0.44 | 0.5 | 5 |
| Example 9 | 84.0 | 37.9 | 215.6 | 318.4 | 1.38 | 0.41 | 0 | 5 |
| Example 10 | 84.1 | 38.0 | 214.9 | 320.3 | 1.39 | 0.42 | 0.5 | 5 |
| Example 11 | 84.0 | 37.8 | 213.4 | 317.9 | 1.38 | 0.40 | 0.5 | 5 |
| Comparative Example 1 | 84.1 | 37.9 | 180.1 | 316.7 | 1.49 | 1.54 | 0 | 5 |
| Comparative Example 2 | 86.3 | 39.9 | 195.0 | 326.4 | 2.10 | 0.72 | 1.5 | 3 |
| Comparative Example 3 | 88.2 | 41.7 | 206.9 | 328.9 | 6.45 | 0.77 | 3.0 | 2 |
| Comparative Example 4 | 86.1 | 39.6 | 202.3 | 310.9 | 5.64 | 2.19 | 2.5 | 5 |

TABLE 2-continued

|  | Hardness | | Tensile strength | Elongation | Migration | Volatile | Stress | Absorption |
|---|---|---|---|---|---|---|---|---|
|  | (Shore A) | (Shore D) | (kgf/cm$^2$) | rate (%) | loss (%) | loss (%) | resistance | rate |
| Comparative Example 5 | 84.5 | 37.9 | 200.2 | 317.2 | 4.24 | 2.50 | 2.5 | 5 |
| Comparative Example 6 | 91.5 | 46.4 | 241.7 | 289.8 | 3.86 | 0.58 | 0.5 | 1 |
| Comparative Example 7 | 83.4 | 37.5 | 209.8 | 308.6 | 1.72 | 0.60 | 1.5 | 1 |
| Comparative Example 8 | 86.7 | 41.3 | 204.6 | 320.6 | 5.78 | 0.30 | 2.5 | 3 |

Referring to the results of Table 2, it could be confirmed that uniform and remarkably excellent physical properties in view of plasticization efficiency, tensile strength, elongation rate, stress resistance, migration loss, and volatile loss are shown in case of applying the plasticizers of Examples 1 to 11 in contrast to cases of applying the plasticizers of Comparative Examples 1 to 8. Particularly, it could be confirmed that processability was excellent in view of the excellent levels of plasticization efficiency and absorption rate. In addition, since it is confirmed that all physical properties were accomplished to equal or better levels as those of the plasticizer of Comparative Example 1, which is the conventional plasticizer having high performance but would induce fatal environmental issues, and it could be confirmed that the plasticizers of the Examples are very suitable as replaceable plasticizers.

Further, it could be confirmed that Comparative Examples 3 to 6, which correspond to the conventional eco-friendly plasticizers developed as replacements of a phthalate-based plasticizer showed defects relating migration resistance and stress resistance, but the plasticizers of the Examples achieved marked improvement of physical properties in view of such migration resistance and stress resistance.

In addition, it could be confirmed that, through Comparative Examples 7 and 8, in which a carboxylic acid having not 6 carbon atoms but 5 or 7 carbon atoms was applied, there were defects of inferior plasticization efficiency and migration resistance or inferior mechanical properties, but the Examples according to the present invention, in which a carboxylic acid having 6 carbon atoms was applied did not show such defects. Further, considering stress resistance and absorption rate, it could be confirmed that improving effects were shown for only cases with 6 carbon atoms, but inferior results were shown for cases with 5 or 7 carbon atoms.

The invention claimed is:

1. A plasticizer composition comprising a tetraester-based composition comprising one or more tetraesters represented by the following Formula (1):

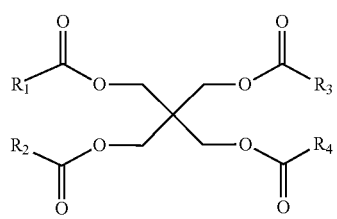

Formula (1)

wherein:

in the Formula 1, $R_1$ to $R_4$ are each independently an n-pentyl group, a branched pentyl group or a cyclopentyl group, and alkyl groups of the one of more tetraesters are derived from an isomer mixture of hexanoic acid having a degree of branching of 2.0 or less, wherein the isomer mixture comprises:

cyclopentyl methanoic acid in an amount of 2 to 15 parts by weight with respect to total 100 parts by weight of the isomer mixture, a branched hexanoic acid in an amount of 80 to 95 parts by weight with respect to total 100 parts by weight of the isomer mixture, and 1-hexanoic acid in an amount of 2 to 10 parts by weight with respect to total 100 parts by weight of the isomer mixture.

2. The plasticizer composition according to claim 1, wherein the degree of branching is 1.5 or less.

3. The plasticizer composition according to claim 1, wherein the branched hexanoic acid comprises 2-methylpentanoic acid and 3-methylpentanoic acid.

4. The plasticizer composition according to claim 1, wherein the branched hexanoic acid comprises 2-methylpentanoic acid.

5. The plasticizer composition according to claim 1, wherein a mixture weight of a triester and a diester that are optionally present in the tetraester-based composition is 5.0 wt % or less with respect to a total weight of the tetraester-based composition.

6. A resin composition, comprising: 100 parts by weight of a resin; and from 5 to 150 parts by weight of the plasticizer composition according to claim 1.

7. The resin composition according to claim 6, wherein the resin is one or more selected from the group consisting of a straight vinyl chloride polymer, a paste vinyl chloride polymer, an ethylene vinyl acetate copolymer, an ethylene polymer, a propylene polymer, polyketone, polystyrene, polyurethane, natural rubber, and synthetic rubber.

8. The plasticizer composition according to claim 1, wherein the degree of branching is 1.5 to 2.0.

* * * * *